United States Patent
Goldstein (10) Patent No.: US 10,379,357 B2
(45) Date of Patent: Aug. 13, 2019

(54) APPARATUS AND METHOD FOR DISPLAYING CONTENT

(71) Applicant: Shai Goldstein, Boca Raton, FL (US)

(72) Inventor: Ben-Zion Yitzchak Goldstein, Ashkelon (IL)

(73) Assignee: Shai Goldstein, Boca Raton, FL (US)

( * ) Notice: Subject to any disclaimer, the term of this patent is extended or adjusted under 35 U.S.C. 154(b) by 0 days.

(21) Appl. No.: 15/541,161

(22) PCT Filed: Nov. 24, 2015

(86) PCT No.: PCT/IL2015/051133
§ 371 (c)(1),
(2) Date: Jun. 30, 2017

(87) PCT Pub. No.: WO2016/110831
PCT Pub. Date: Jul. 14, 2016

(65) Prior Publication Data
US 2017/0357094 A1    Dec. 14, 2017

Related U.S. Application Data

(60) Provisional application No. 62/101,124, filed on Jan. 8, 2015, provisional application No. 62/141,016, filed on Mar. 31, 2015.

(51) Int. Cl.
*G02B 27/14* (2006.01)
*G02B 27/01* (2006.01)
(Continued)

(52) U.S. Cl.
CPC ....... *G02B 27/0172* (2013.01); *G02B 27/017* (2013.01); *G02C 5/001* (2013.01);
(Continued)

(58) Field of Classification Search
CPC .... G02B 5/30; G02B 27/0172; G02B 27/017; G02B 2027/0178; G02B 2027/014; G02B 2027/0132; G02B 2027/0134
(Continued)

(56) References Cited

U.S. PATENT DOCUMENTS 4,869,575 A * 9/1989 Kubik ............... G02C 7/14
                                                    345/8
5,539,578 A * 7/1996 Togino ............. G02B 27/017
                                                    345/7

(Continued)

FOREIGN PATENT DOCUMENTS

JP     2014003426 A    1/2014
WO     2013049248 A2   4/2013

OTHER PUBLICATIONS

Notification of Transmittal of the International Search Report and the Written Opinion of the International Searching Authority, or the declaration; the International Search Report, and the Written Opinion of the International Searching Authority regarding PCT/IL2015/051133, dated Mar. 8, 2016 (20 pages).

*Primary Examiner* — Mahidere S Sahle
(74) *Attorney, Agent, or Firm* — Laurence A. Greenberg; Werner H. Stemer; Ralph E. Locher (57) ABSTRACT

The present invention relates to a wearable apparatus which can display content from a content provider to the user's view comprising: a head-mountable frame wearable by a user; a display for projecting an image; communication means for communicative association with said content provider; and reflective means for reflecting said content from said display to the user's view.

19 Claims, 10 Drawing Sheets

(51) Int. Cl.
*G02C 5/00* (2006.01)
*G02C 5/12* (2006.01)
*G02C 5/14* (2006.01)

(52) U.S. Cl.
CPC ............... *G02B 2027/0138* (2013.01); *G02B 2027/0141* (2013.01); *G02B 2027/0178* (2013.01); *G02C 5/12* (2013.01); *G02C 5/14* (2013.01)

(58) Field of Classification Search
USPC ........................... 359/13, 630, 632; 345/7–9
See application file for complete search history.

(56) References Cited

U.S. PATENT DOCUMENTS

| | | | |
|---|---|---|---|
| 5,742,262 A * | 4/1998 | Tabata | G02B 27/0081 345/8 |
| 6,191,892 B1 * | 2/2001 | Isaka | G02B 27/017 359/630 |
| 2005/0057439 A1 | 3/2005 | Hata | |
| 2007/0064311 A1 | 3/2007 | Park | |
| 2010/0085462 A1 * | 4/2010 | Sako | G02B 27/017 348/333.01 |
| 2011/0043436 A1 * | 2/2011 | Yamamoto | G02B 27/0172 345/8 |
| 2012/0212400 A1 | 8/2012 | Border et al. | |
| 2013/0163089 A1 | 6/2013 | Bohn | |
| 2013/0346168 A1 | 12/2013 | Zhou et al. | |
| 2015/0177519 A1 * | 6/2015 | Cakmakci | G02B 27/0172 359/631 |
| 2016/0116745 A1 * | 4/2016 | Osterhout | G06F 3/03547 359/614 |
| 2016/0131907 A1 * | 5/2016 | Martinez | G02B 17/0832 359/631 |
| 2016/0178905 A1 * | 6/2016 | Rider | G06F 3/0489 345/8 |
| 2017/0007351 A1 | 1/2017 | Yu | |

* cited by examiner

FIG. 7A

APPARATUS AND METHOD FOR DISPLAYING CONTENT

TECHNICAL FIELD

The present invention relates to an apparatus and method for displaying content to a user. More particularly, the invention relates to a wearable head-mounted display for displaying content, received from a content provider, to a user.

BACKGROUND

Optical head-mounted displays are wearable devices that include a display operative to enable viewing an image received from a source, such as a portable processing device. The head-mounted display typically employs suitable viewing optics for the purpose of superimposing the image with parts of the surrounding scene. Thus, the image is typically superimposed on the direct view of the user. The viewing display is operative such that a wearer is not required to look away from his viewpoint to view the combined image.

These display devices may find utility in many areas, such as training, machine control, and entertainment. Their viewing optics may use various technologies including, for example, waveguiding and/or holographic technologies. These technologies are, however, relatively complex and costly to implement.

It would therefore be desired to propose a system void of these deficiencies.

SUMMARY

It is an object of the present invention to provide a wearable apparatus which can display content to the user.

It is another object of the present invention to provide a wearable apparatus which can display content on the user's view.

It is still another object of the present invention to provide a wearable apparatus which can display content on the user's view without substantially obstructing the user's view.

Other objects and advantages of the invention will become apparent as the description proceeds.

The present invention relates to a wearable apparatus which can display content from a content provider to the user's view comprising: a head-mountable frame wearable by a user; a display for projecting an image; communication means for communicative association with said content provider; and reflective means for reflecting said content from said display to the user's view.

Preferably, the reflective means are adjustable to fit the user's view.

Preferably, the wearable apparatus comprises means for magnifying the displayed content.

In one embodiment, the reflective means comprise a mirror.

Preferably, the mirror is a transparent mirror.

In one embodiment, the reflective means comprises a waveguide.

Preferably, the waveguide is a prism.

Preferably, the prism comprises means for magnifying the displayed content.

Preferably, the content is textual content.

Preferably, the wearable apparatus comprises an image capturing device.

Preferably, the wearable apparatus comprises a sound capturing device.

Preferably, the wearable apparatus comprises a sound output device.

Preferably, the wearable apparatus comprises an input device.

Preferably, the wearable apparatus is operative to accommodate one or more lenses.

BRIEF DESCRIPTION OF THE DRAWINGS

The accompanying drawings, and specific references to their details, are herein used, by way of example only, to illustratively describe some of the embodiments of the invention. Reference numerals may be repeated among the figures to indicate corresponding or analogous elements.

In the drawings.

DETAILED DESCRIPTION

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
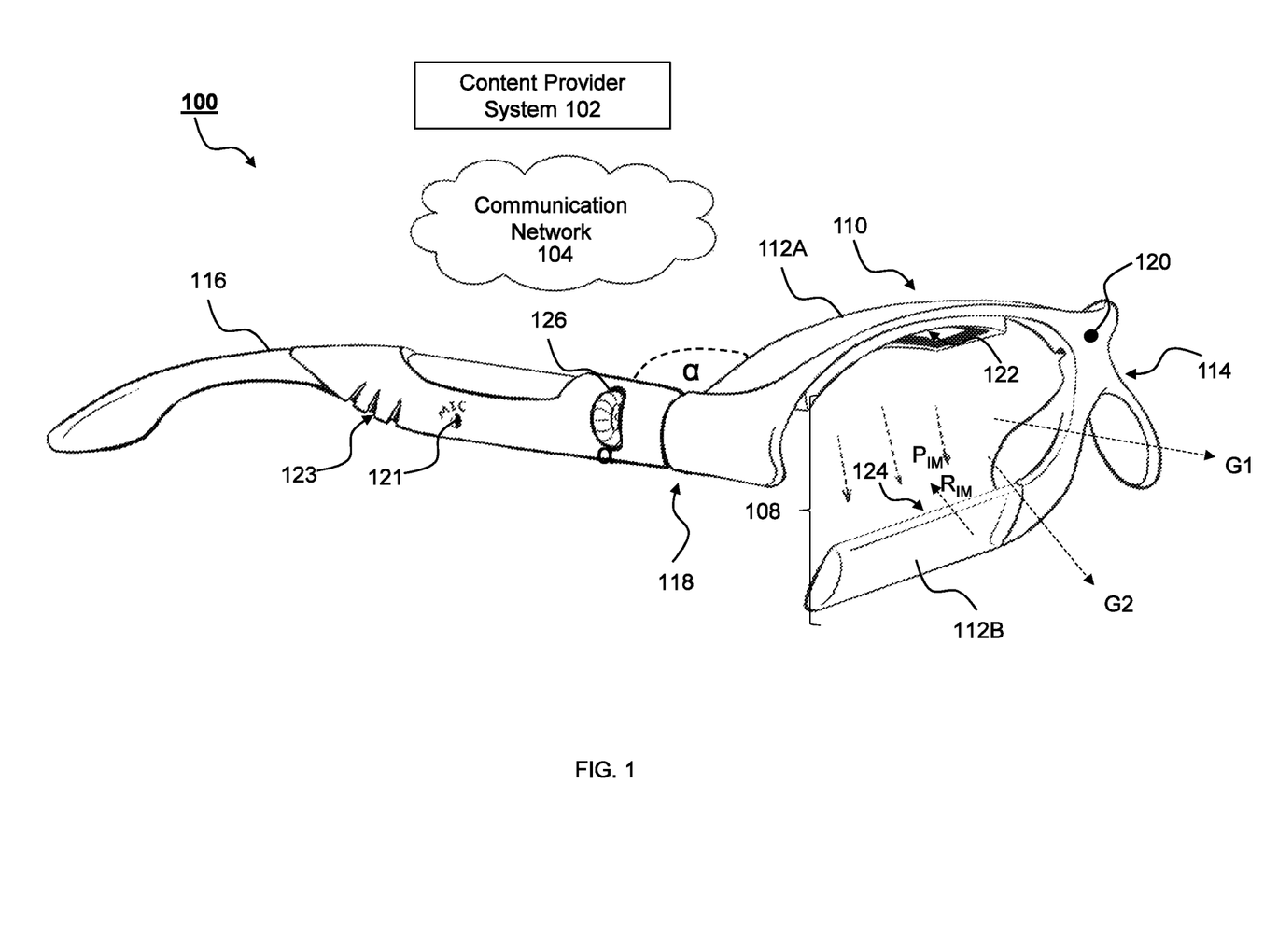
FIG. 1 is a schematic perspective view illustration of a wearable electronic apparatus in communicative association with a content provider system, according to an embodiment.

FIG. 1 is a perspective view illustration of a wearable electronic apparatus 100 in communicative association with a content provider system, according to an embodiment of the invention. Aspects of embodiments relate to a wearable electronic apparatus 100 operative to provide its user with content that is displayed in front of the user's main view. The content may be letters, words, pictures, images, videos or any other visual content provided by an electronic system. In some embodiments, the content is superimposed and/or displayed to the user so that the user's main viewing or eye-gaze direction remains substantially or at least largely unobstructed. In some embodiments, the wearable electronic apparatus 100 includes a display 122, which may be an LCD display or any other display capable of projecting content. The display 122 may project content to the reflective optics 124 which may be a mirror, or any other reflective material or shape, which may be arranged to reflect the content to the user's eye. In some embodiments, the reflective optics 124 may be transparent or semi-transparent in order to allow the user to see through the reflective optics 124 while viewing the content. Hence, the user may see both, the displayed content, in front of his view, and his view gaze. In some embodiments the reflective optics 124 may have adjusting means for adjusting its angle to best reflect the content to the user's eye. The display 122 may be in communicative association with a content provider using the communication network 104 of any known wired or wireless communication method such as Bluetooth, Wi-Fi, cellular network, NFC, etc. The content provider may be a Smartphone, Tablet, computer, server, or any electronic apparatus which can provide and communicate content. Thus a user may, for example, wear the wearable electronic apparatus 100 and communicatively connect to his smartphone using Bluetooth for displaying content from his smartphone to his eye. For example, the user may walk on the street while reading text messages received on his smartphone.

In some cases the wearable electronic apparatus may be operative to receive data descriptive of the content to be displayed by the viewing optics as an image from an external information provider system, e.g., via a communication network. In one example the user may connect the wearable electronic apparatus to a remote server, using a cellular network for example, for displaying content to his eye from the Internet.

Figure 2:
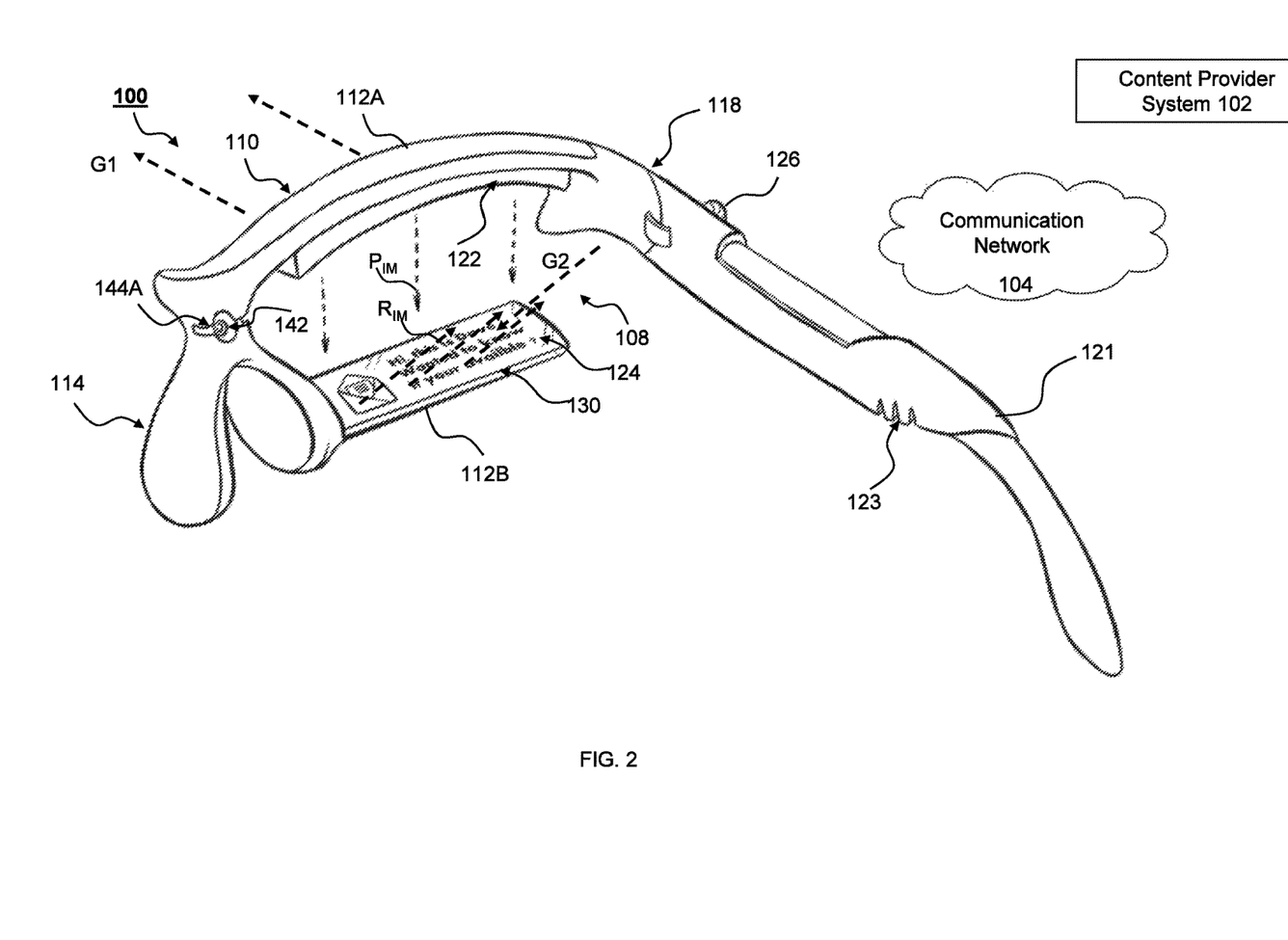
FIG. 2 is another schematic perspective view illustrations of the wearable electronic apparatus in association with the content provider system, according to an embodiment.

FIG. 2 is another schematic perspective view illustrations of the wearable electronic apparatus 100 in association with the content provider system, according to an embodiment. As described, in relations to FIG. 1, the wearable electronic apparatus 100 is operative to provide its user with content that is displayed in front of the user's main view.

Figure 3:
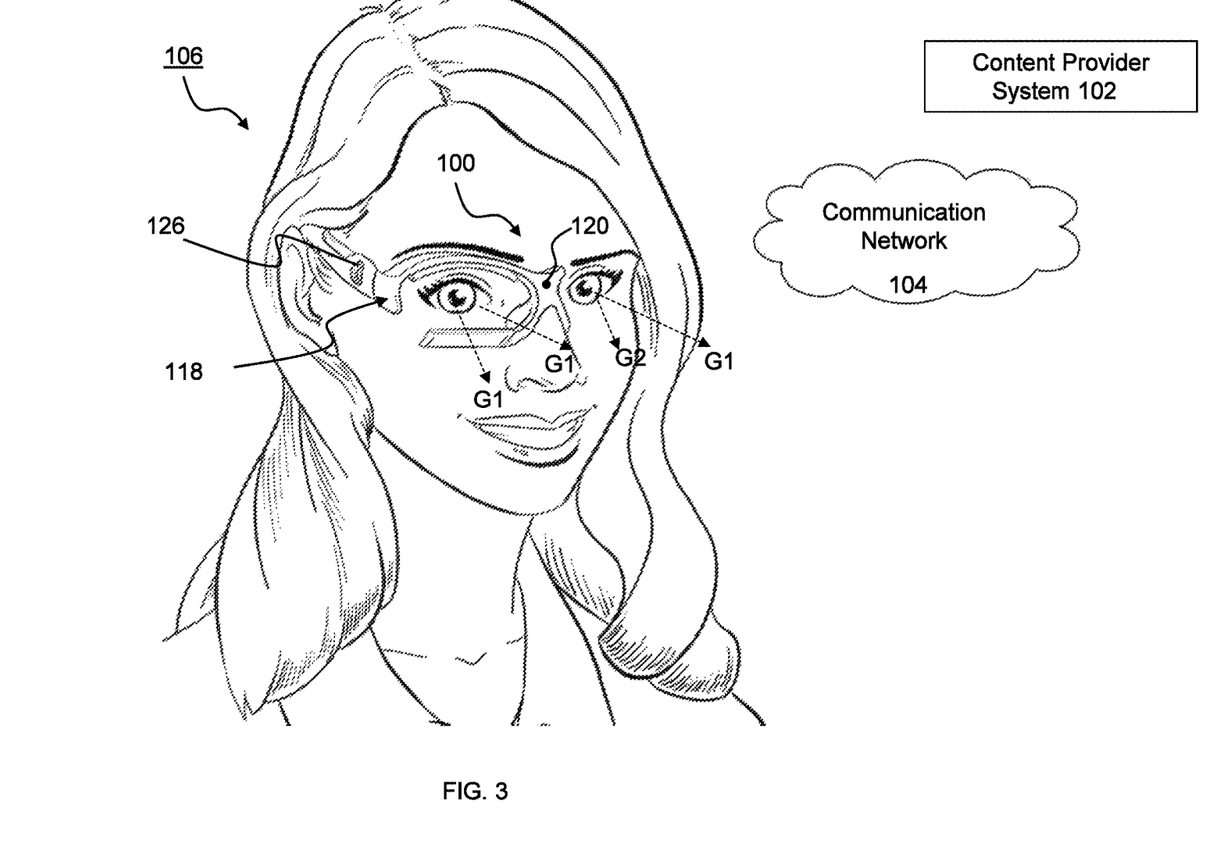
FIG. 3 is a schematic perspective view illustration of a user wearing the electronic apparatus, according to an embodiment.

FIG. 3 is a schematic perspective view illustration of a user wearing the electronic apparatus, according to the embodiments shown in FIGS. 1 and 2. The wearable (e.g., head-mountable) electronic apparatus 100 is operative to receive content from a content provider system via a communication network 104. Electronic apparatus 100 is operative to display the content to a user 106 through the wearable electronic apparatus 100, as outlined herein below in greater detail. Content provider system 102 may for example include and/or relate to multifunctional computerized devices ("Smartphones"), to other wearable electronic apparatuses, servers, and/or the Internet.

Wearable electronic apparatus 100, as described in relations to FIG. 1-3, may be a head-mountable device that includes a head-mountable frame having a center frame portion 110 comprising an upper and a lower frame portion 112A and 112B, respectively. Center frame portion 110 may have a nosepiece 114 which can be accommodated onto a nose of the user. When the apparatus is worn by the user, one or more bows 116 of the frame may extend from edges 118 of center frame portion 110 past the user's temple and toward the user's ear such that bow 116 and center frame portion 110 may form an angle of, e.g., about $\alpha=90°$ relative to each other. According to some embodiments, the frame body may have a monocular configuration. Correspondingly, center frame portion 110 may have a monocular lens frame body (e.g., as figuratively shown in FIG. 1), or, in another embodiment, a binocular lens frame body (not shown). A monocular lens frame body refers to a frame designed to encircle only one of the user's eyes, whereas a binocular lens frame body refers to a frame designed to encircle both eyes of the user. Such a monocular lens frame may have only one bow 116 coupled thereto, according to one embodiment. Thus, electronic apparatus 100 may be supported to be worn by user 106 by a single bow and nosepiece 114. In one embodiment, the lower frame portion 112B is also attached to the edge 118 of center frame portion 110 in addition to being attached to the nosepiece 114. In another embodiment, the lower frame portion 112B is attached to the edge 118 of center frame portion 110 instead of being attached to the nosepiece 114. Although discussions herein may relate to embodiments where center frame portion 110 includes a monocular lens frame body, this should by no means to be construed as limiting. Accordingly, embodiments disclosed herein may analogously applicable to apparatuses 100 having a binocular lens frame body.

Viewing optics 108 may be included and/or mounted on center frame portion 110. In other embodiments, at least some or all of elements or components of viewing optics 108 may also be included and/or mounted on bow 116. Viewing optics 108 may include a display 122 and a reflective optics 124 arranged relative to display 122 to relay (e.g., reflect) content displayed on display 122 towards an eye of user 106 wearing electronic apparatus 100. Data descriptive of the content may be received by electronic apparatus 100 from external content provider system 102.

According to some embodiments, electronic apparatus 100 may include an image capturing device 120 (e.g. a camera), a sound capturing device 121 (e.g. a microphone), a sound output device 123 (e.g., speakers) and/or an input device 126. As illustrated schematically in FIG. 1, image capturing device 120 may be arranged on center frame portion 110. Image capturing device 120 may comprise a front or forward-looking camera and, optionally, a backwards-looking camera, a downward-looking camera, and/or a side-ways looking camera or camera(s). Sound capturing device 121 and sound output device 123 may be incorporated with center frame portion 110 and/or with bow 116. Input device 126 may be mounted in bow 116.

Input device 126 may for example be embodied by a wheel input element or knob, and/or by a touch sensitive surface (e.g., touch screen) for enabling user 106 to control the speed of the scrolling of the content displayed to him/her. Input device 126 may for example be used to speed up, slow down or even reverse the scrolling of content, depending on the speed and direction of rotation of the wheel input element, displayed to user 106. Input device 126 may further enable the remote controlling of image capturing device 120 e.g., for zooming in and zooming out into a scene captured by image capturing device 120.

In some embodiments, when worn by the user, the viewing optics 108 are positioned relative to the user's eye(s) such that the user, who may have a primary eye-gaze direction for viewing his/her usual or "normal" viewpoints, can view the displayed image by altering his eye-gaze direction from the primary eye-gaze direction to a secondary or non-primary eye-gaze direction for viewing the image, and vice versa. The image displayed by the viewing optics may not be or may only negligibly be superimposed to parts of a scene surrounding the apparatus and viewed by the user gazing in the primary eye-gaze direction. In some of the embodiments, the user's field-of-view, respective of the primary or normal eye-gaze direction remains substantially unobstructed by the viewing optics, even if an image is displayed thereby. It is noted that a change in the orientation of the user's head alone may not result in a change in the user's gazing direction relative to the apparatus's viewing optics. Otherwise stated, the viewing optics 108 may be stationary with respect to the orientation of the user's head. In some cases the content may be related to the user's view.

In FIGS. 1-3, a primary and second secondary eye gaze direction, of a user 106, are schematically illustrated by arrows G1 and G2, respectively. The fields-of-views respective of the primary and secondary eye-gaze directions G1 and G2 may partially overlap. In some embodiments, the fields-of-views respective of the primary and secondary eye-gaze directions G1 and G2 may overlap only slightly or negligibly, or may not overlap at all. In the embodiment illustrated, primary eye-gaze direction G1 may point in a direction that may be generally normal and in forward or rostral direction with respect to an imaginary coronal plane (not shown) of the user's head.

Correspondingly, as schematically shown in FIG. 2, secondary eye-gaze direction G2 may for example be generally tilted downwards (i.e., downward-looking) relative to the primary eye-gaze direction. In other words, secondary eye-gaze direction G2 may be in tilted direction towards the coronal plane yet still generally forward-looking.

With references to FIGS. 1 and 3, in some embodiments, display 122 may be in substantial optical alignment with reflective optics 124 such that a source image (not shown), e.g. a content, displayed on display 122 may be relayed from the display to reflective optics 124 by projecting rays $P_{IM}$, and from reflective optics 124 towards user 106 as a reflected image 130 by reflecting rays $R_{IM}$. Reflective optics 124 may for example be operative such that the optical axis and/or direction of reflective rays $R_{IM}$ substantially coincide with secondary eye-gaze direction G2 of user 106 wearing electronic apparatus 100. Therefore, user 106 gazing in the secondary eye-gaze direction G2 relative to electronic apparatus 100 can see the source image displayed on display 122 as a reflection from reflective optics 124.

According to some embodiments, display 122 may be mounted on upper frame portion 112A and reflective optics 124 may be mounted on lower frame portion 112B. Accordingly, display 122 may be located above a user's eye and reflective optics 124 below the user's (same) eye. In some other embodiments, display 122 may be mounted on lower frame portion 112B and reflective optics 124 may be mounted on upper frame portion 112A. Additional or alternative configurations may also be considered. For instance, display 122 may be mounted on nosepiece 114 and reflective optics 124 may be mounted sideways on the outer edge of center frame portion 110.

In some embodiments, with respect to the primary eye-gaze direction G1, reflective optics 124 may be positioned in the blind spot of the user's eye with which viewing optics 108 are associated. Thus, user 106 won't be bothered by image 130 reflected by reflective optics 124 and may see image 130 only when he/she has shifted his/her eye sight to look at the display of reflective optics 124 in direction of the secondary eye-gaze direction. In this way, user 106 may wear electronic apparatus 100 and gaze at the reflected image 130 only when he/she desires. Accordingly, visual discomforts that may be otherwise experienced by user 106 may be reduced.

The illustrated position of the viewing optics 108 should not be interpreted as limiting in any way. In some embodiments, the viewing optics 108 may be positioned in different location, such that reflective optics 124 may be located at the side of the user's eye, or at the bottom right or left of the user's eye, etc.

In any case, viewing optics 108 are operative such that the reflected content relayed to user 106 is interpretable by the user. For instance, text which is relayed to user 106 is not mirror-inverted. Accordingly, in the embodiments exemplified herein, to avoid the display of mirror-inverted text, the content displayed on display 122 may contain text that is mirror-inverted and which may then be relayed by viewing optics 108 (e.g., through reflection by reflective optics 124) to become non-mirror inverted.

According to some embodiments, viewing optics 108 may be operative such that the reflected image viewable by user 106 is magnified relative to the source image displayed on display 122. For instance, reflective optics 124 may include a magnifying reflective surface. Magnification of the source image may be, for example, by a magnitude of at least 2, 4, 6, 8, 10, 12, 14, 16, 18, or 20.

Display 122 may have a substantially flat screen surface. Alternatively, display 122 may have a concave shape with one or more axes of curvatures. The width and length of the screen may have a ratio ranging from, for example, 1:3 to 1:4, 1:5, 1:6, 1:7, 1:8, 1:16, or any other ratio. In some embodiments, display 122 may be recessed in upper frame portion 112A, e.g., so that it may not be seen from an outside point of view when a person looks about straight into the user's face.

Reflective optics 124 may comprise a mirror, which may be a fully-reflective mirror, or a partially reflective and partially transparent mirror. The mirror's reflective surface may be substantially a plane or may have a concave shape and one or more axes of curvatures.

The position and/or orientation of display 122 and/or reflective optics 124 may be adjustable relative to center frame portion 110.

As already briefly mentioned herein above, center frame portion 110 may in one embodiment have a monocular lens frame body and in another embodiment a binocular lens frame body (not shown). In embodiments where center frame portion 110 includes a binocular lens frame body, viewing optics 108 may be operative to reflect content to each of the two eyes of user 106. For example, reflective optics for each of the two eyes may be employed. Furthermore, one or more displays may be employed for projecting content to the reflective optics. A content reflected to the two eyes of user 106 may contain identical or different image information. For example, a first image may be relayed to the user's left eye and a second image may be relayed to the user's right eye. Alternatively, the same image content may be relayed via the viewing optics to the user's right and left eyes. In some embodiments, a first content may first be relayed to one of the user's eyes and, subsequently, a second content may be relayed to the other eye of the user. In some embodiments, at least for some periods of time, the first content may not be relayed while the second content is relayed. In some other embodiments, the second content may only be relayed while the first content is not relayed.

Figure 4A:
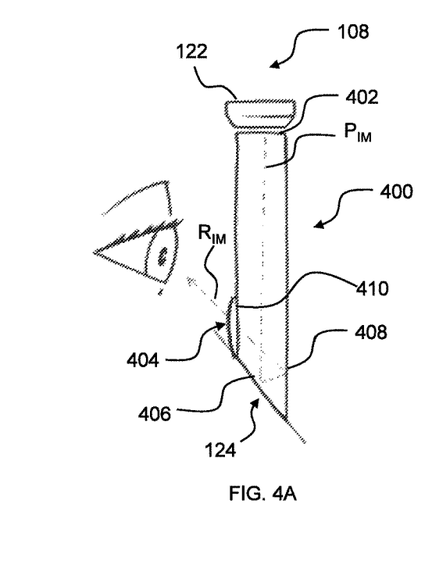
FIGS. 4A to 4C are schematic perspective view illustrations of embodiments of viewing optics of a wearable electronic apparatus.
Figure 4B:
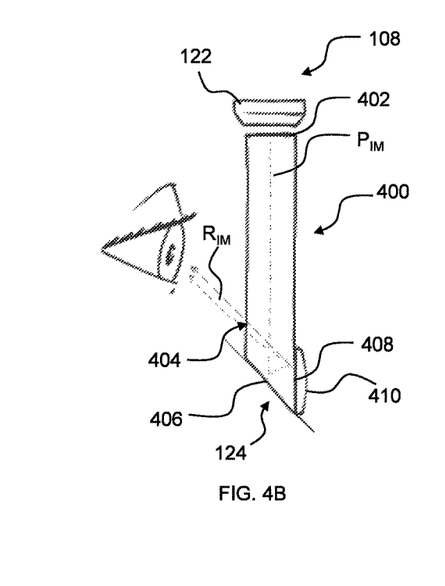
Figure 4C:
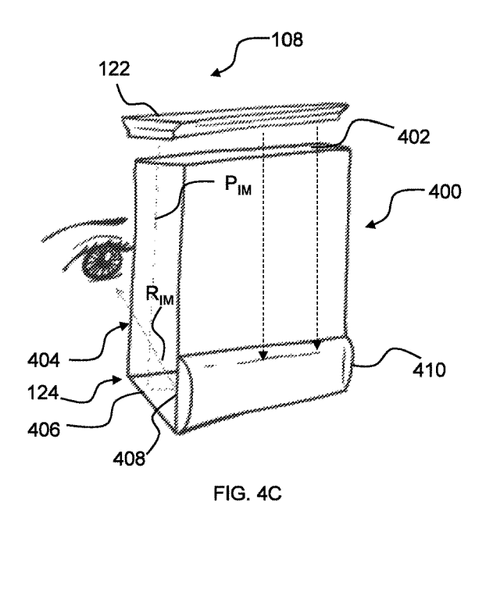

Further reference is made to FIGS. 4A-4C. In some other embodiments, viewing optics 108 may be implemented by employing, inter alia, an optical waveguide element having an image receiving side operative to receive a projected image from display 122. The waveguide element, e.g. reflective optics 124, is further operative to make a displayed image of the projected content visible to the user's view. Such a waveguide element can be obtained through suitable shape, material characteristics and/or arrangement of the element relative to display 122.

According to some embodiments, the waveguide element may include a prism 400 structured to have an image receiving side 402 arranged to receive rays $P_{IM}$ projected by screen 122, and a viewing side 404 for viewing the relayed image. Image receiving side 402 may for example be about perpendicular to viewing side 404. In addition, prism 400 may have a first reflection surface 406 opposite image receiving side 402, and a second reflection surface 408 opposite viewing side 404.

In some embodiments, projecting rays PIM incident onto image receiving side 402 may enter and propagate within prism 400 towards first reflection surface 406 and be reflected as reflected rays RIM from first reflection surface 406 to second reflection surface 408. Rays RIM reflected from second reflection surface 408 may exit prism 400 via viewing side 404 for viewing by the user. Rays PIM may propagate about parallel to the waveguiding surfaces (e.g., viewing side 404 and second reflection surface 408) towards first reflection surface 406.

First reflection surface 406 may form a first incident angle with respect to the incoming projecting rays $P_{IM}$ emitted by display 122 such that at least some of the projecting rays $P_{IM}$ are reflected by first reflection surface 406 towards second reflection surface 408. The first incident angle between projecting rays $P_{IM}$ and first reflection surface 406 may for example be larger than a corresponding first critical angle to cause reflection by first reflection surface 406. In embodiments where the angle formed between projecting rays $P_{IM}$ and first reflection surface 406 is smaller than the critical angle, first reflection surface 406 may have a first reflective coating (not shown).

Furthermore, second reflection surface 408 may form with projecting $R_{IM}$ a second incident angle that is smaller than a corresponding second critical angle, in which case second reflection surface 408 may have a second reflective coating (not shown). The second incident angle may for instance be smaller than the second critical angle when second reflection surface 408 is about perpendicular to image receiving side 402, as shown schematically FIGS. 4A-4C.

In some embodiments, prism 400 may be operative to have magnifying properties. For that purpose, prism 400 may have a convex-shaped surface 410, e.g., at viewing side 404 (FIG. 4A) and/or at second reflection surface 408 (FIG. 4B). In other words, viewing side 404 and/or second reflection surface 408 may be shaped in a convex manner to have optically magnifying properties.

Figure 5A:
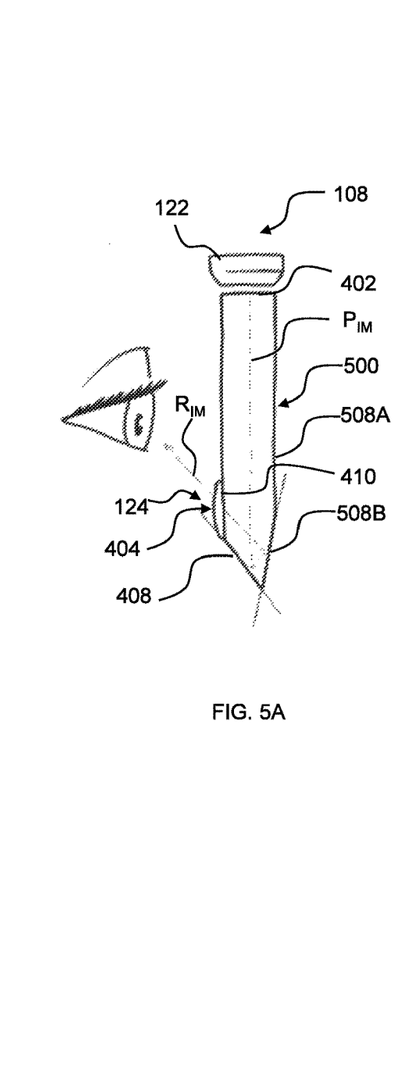
FIGS. 5A to 5C are schematic perspective views illustrations of further embodiments of viewing optics of a wearable electronic apparatus.
Figure 5B:
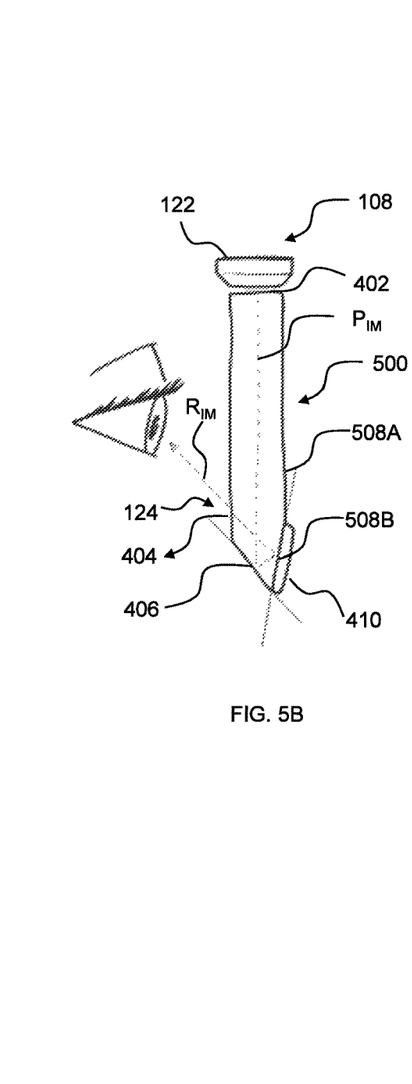
Figure 5C:
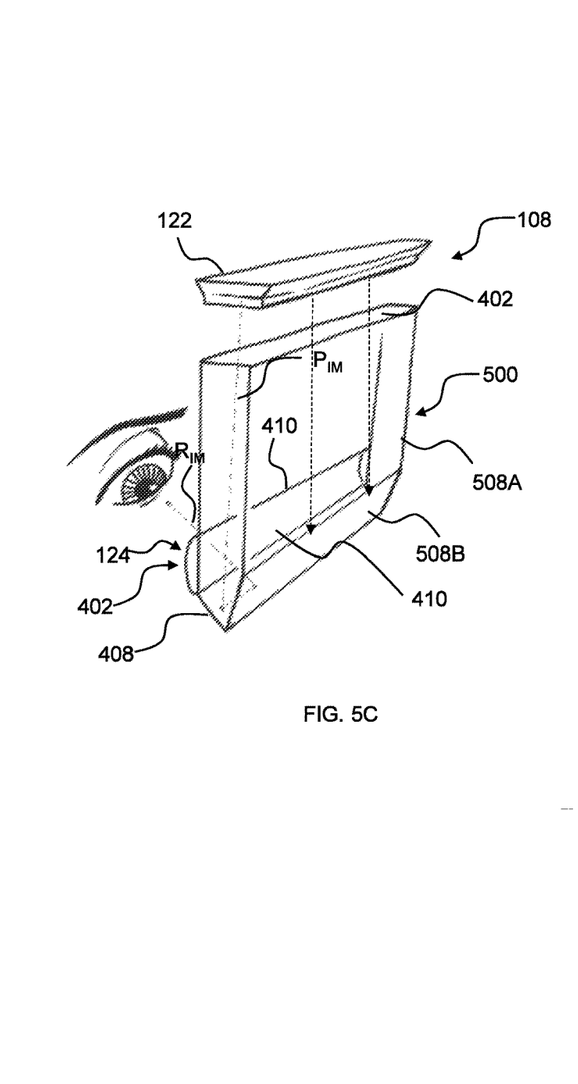

Further reference is now made to FIGS. 5A-5C. In some embodiments, a prism 500 may be operative such that the magnitude of the second incident angle of rays $R_{IM}$ with respect to a second reflection surface portion 508B is greater than the second critical angle. Second or slanted reflective surface portion 508B may be a slanted portion of a surface 508A that may extend about perpendicularly from image receiving side 402. All the magnification properties could be in a convex manner along the length of the glass or along the width of the glass. The second incident angle may for example be larger than the second critical angle if second reflection surface portion 508B is slanted towards viewing side 404, as illustrated schematically in FIGS. 5A-5C. In view of the aforesaid, second reflection surface portion 508B can thus be free of a reflective coating.

Similar to what has been discussed with respect to FIGS. 4A-4C, prism 500 may have magnifying properties. For that purpose prism 500 may have a convex-shaped surface 410, e.g., at viewing side 404 (FIG. 4A) and/or at second (slanted) reflective surface 508B (FIG. 5B). In other words, viewing side 404 and/or second, slanted reflective surface 508B may be shaped in a convex manner to have optically magnifying properties.

Figure 5D:
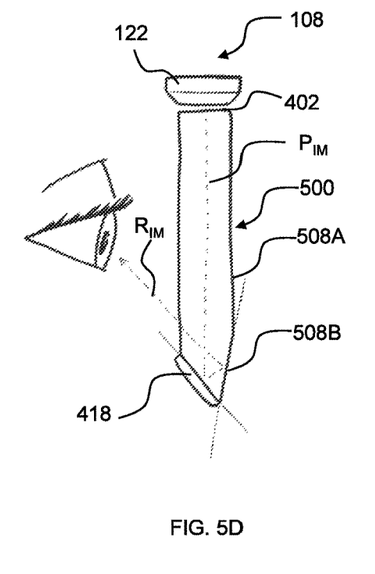
FIGS. 5D to 5F are schematic perspective views illustrations of furthermore embodiments of viewing optics of a wearable electronic apparatus.
Figure 5E:
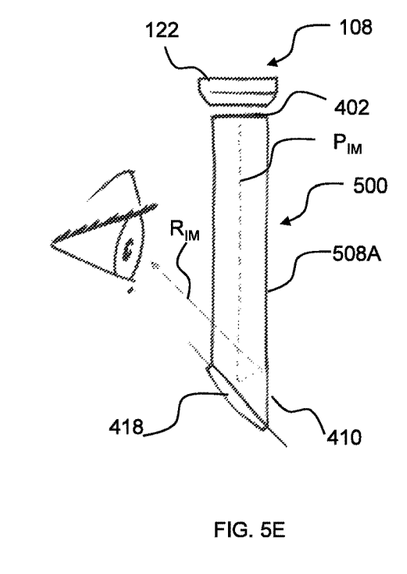
Figure 5F:
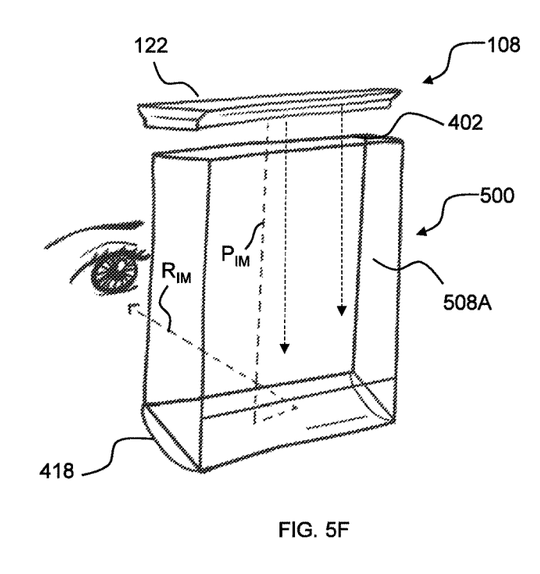
Figure 5G:
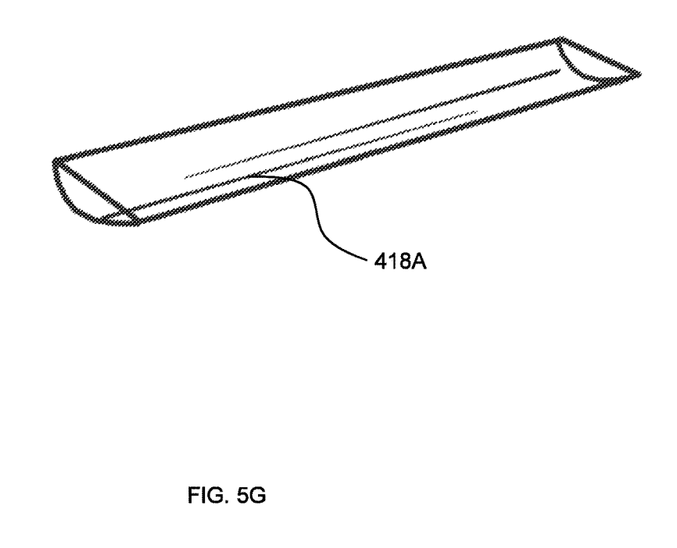
FIG. 5G is a schematic perspective view illustration of the convex shaped surface, according to an embodiment of the invention.
Figure 5H:
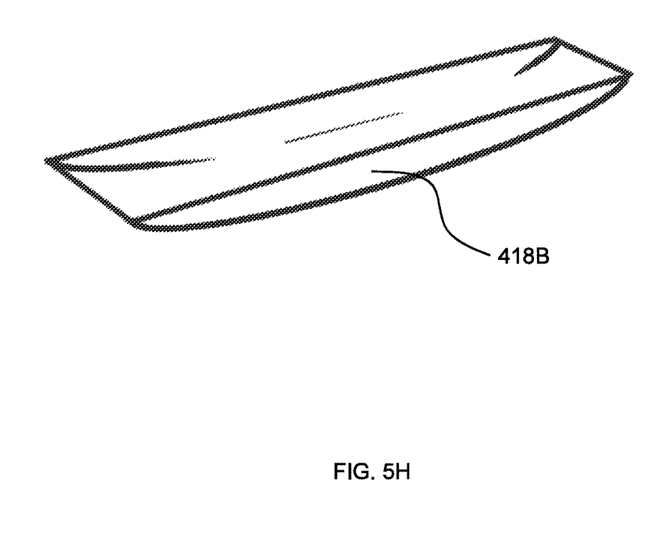
FIG. 5H is a schematic perspective view illustration of the convex shaped surface, according to another embodiment of the invention.

Further reference is now made to FIGS. 5D-5F. In some embodiments, prism 500 may be operative to have magnifying properties. For that purpose, prism 500 may have a convex-shaped surface 418, e.g., at the bottom side. In other words, the bottom part may be shaped in a convex manner to have optically magnifying properties. Thus, when projecting rays $P_{IM}$ incident onto image receiving side 402 they may enter and propagate within prism 500 towards convex-shaped surface 418 and be reflected and magnified as reflected rays $R_{IM}$ to the second reflection surface 508B. Rays $R_{IM}$ reflected from second reflection surface 508B may exit prism 500 via the viewing side for viewing by the user. The magnification properties of the convex shaped surface 418 may be in a convex manner along the length of the glass 418A, as depicted in FIG. 5G for example, or along the width of the glass 418B as depicted in FIG. 5H for example.

Figure 6:
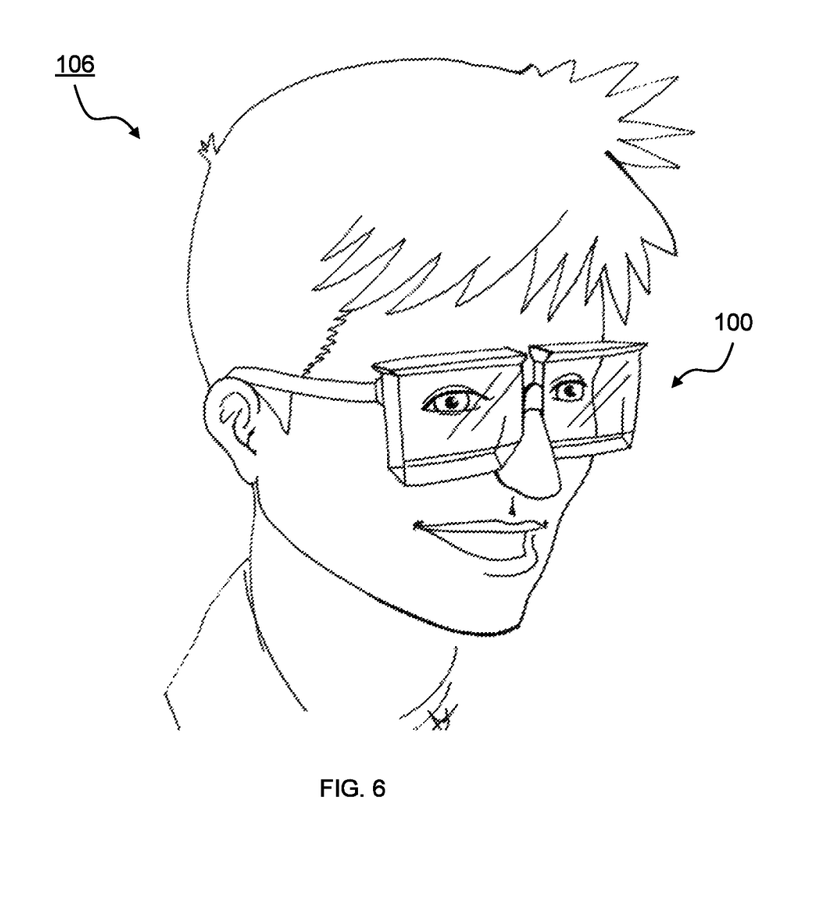
FIG. 6 is a schematic perspective view of the user wearing an electronic apparatus comprising viewing optics according to an embodiment.

As illustrated schematically in FIG. 6, the waveguiding element (e.g., prisms 400 and/or 500) may be incorporated in, or embody lenses of wearable electronic apparatus 100 and, optionally, have vision correction properties and/or provide protection from sunlight for example. Viewing side 404 may have a length to width display ratio of, for example, 1:3 to 1:4, 1:5, 1:6, 1:7 or 1:8 or 1:16. The waveguiding element may be incorporated in a monocular lens frame body (not shown) or in a binocular lens frame body.

In other embodiments, the prism, such as prisms 400 and/or 500, may have a contour, shape, or size different than illustrated in FIGS. 4A-6 as long as the prism is operative to make a displayed image of the projected content from the display 122 visible to the user's view.

Figures 7A, 7B:
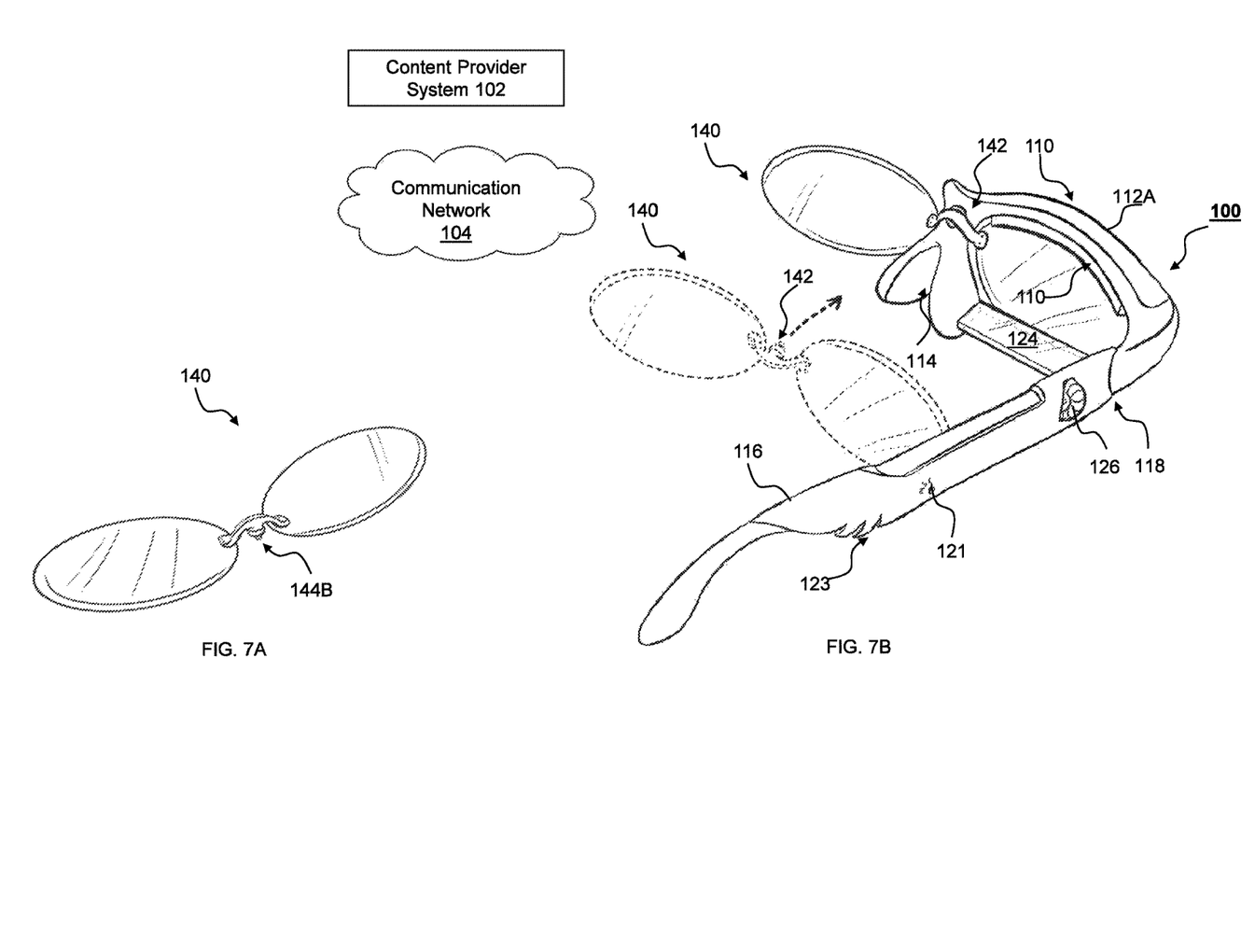
FIG. 7A is a schematic perspective view illustration of a lens arrangement that can be coupled to the wearable electronic apparatus according to an embodiment.
FIG. 7B is a schematic perspective view illustration of the wearable electronic apparatus shown in the FIGS. 1 to 3 accommodating the lens arrangement shown in FIG. 7A, according to some embodiments.

Additional reference is made to FIGS. 7A and 7B. Electronic apparatus 100 may be operative to receive or accommodate (e.g., in a removable manner) one or more lenses (hereinafter: lens arrangement) 140 (in the monocular and binocular design, respectively) used, for example, for vision correction and/or for providing protection from sunlight and/or merely as a fashion accessory. Center frame portion 110 and/or lens arrangement 140 may for example include fastener elements 142 (FIG. 7B) that are adapted to enable (e.g., removable) coupling of lens arrangement 140. Fastener elements 142 may include, for example, a snap fastener, a bracket, a clip, a brace or any other suitable fastener element(s). For instance, fastener elements 142 (shown figuratively in FIG. 7B) may include a recess 144A (shown figuratively in FIGS. 2 and 7B) formed, e.g., in nosepiece 114 and a protrusion 144B (shown figuratively in FIG. 7B) arranged, e.g., on lens arrangement 140, which is form-fittingly snapable (in a removable manner) into the recess such that lens arrangement 140 is fixed in position to electronic apparatus 100. Clearly, in alternative embodiments, a recess may be formed in lens arrangement 140 and a corresponding protrusion may be arranged on nosepiece 114. Additional or alternative configurations for fastener elements 142 may be employed.

As shown schematically in FIG. 7B, electronic apparatus 100 may in one embodiment be operative such that lens arrangement 140 can be accommodated distal or "downstream" of viewing optics 108 with respect to primary viewing direction G1 so that when electronic apparatus 100 is worn by user 106, viewing optics 108, as described in relations to FIG. 1, are positioned between the user's face and lens arrangement 140. In another embodiment, lens arrangement 140 can be accommodated proximal or "upstream" of viewing optics 108 so that when electronic apparatus 100 is worn by user 106, lens arrangement 140 is positioned between the user's face and viewing optics 108. As shown schematically in FIG. 7B, in the embodiment of a monocular frame, one of the two lenses of a lens arrangement may be free-standing. According to some embodiments, center frame 110 and/or nosepiece 114 and/or bows 116 may include springy elements (not shown) and/or have a springy configuration such to fittingly or snugly engage with and about against body features (e.g., the nose and/or behind the auricles) of user 106.

Figure 8:
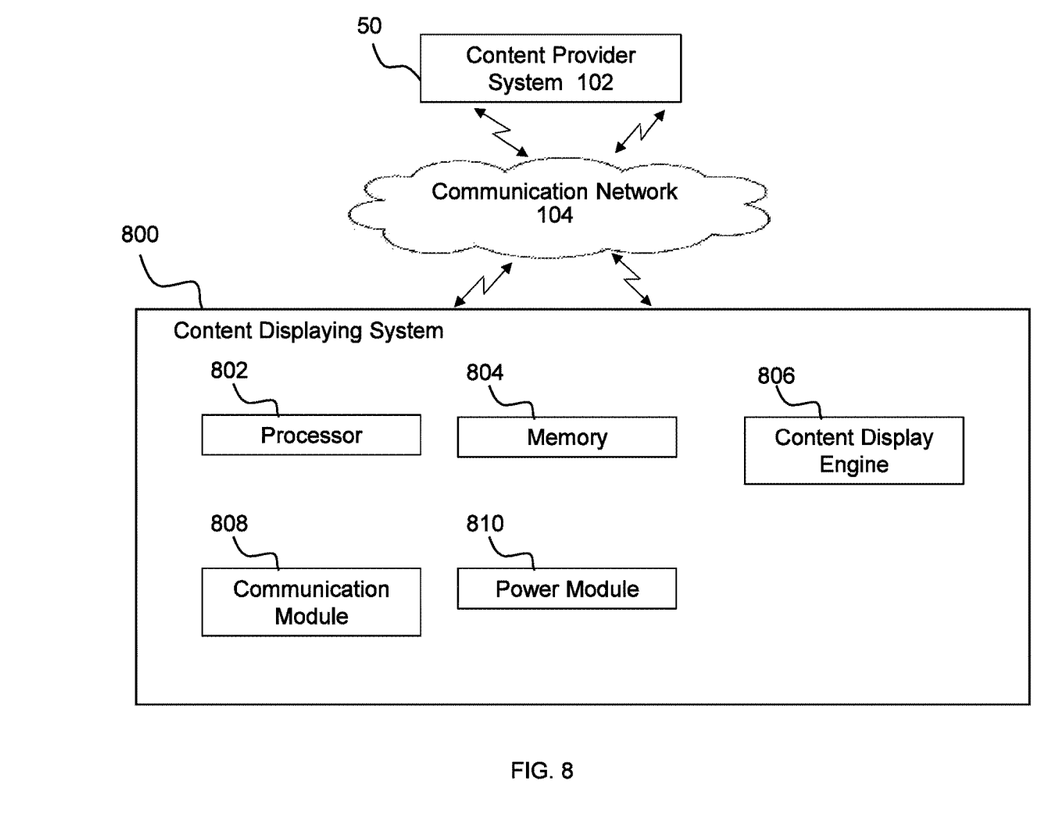
FIG. 8 is a schematic block-diagram illustration of a content displaying system for controlling various components of the wearable electronic apparatus and operative to receive data from a content provider system, according to some embodiments.

Additional reference is now made to FIG. 8. Wearable electronic apparatus 100 may comprise and/or may be operatively coupled with components of a content displaying system 800 for controlling image capturing device 120, sound capturing device 121, sound output device 123 and/or input device 126, as described in relations to FIGS. 1-3. Content displaying system 800 may include some or all of the following components: a processor 802, a memory 804, a content display engine 806, a communication module 808 and a power module 810 for powering the various components of content displaying system 800 and of wearable electronic apparatus 100. Image capturing device 120, sound capturing device 121, sound output device 123 and/or input device 126 may be operatively coupled with each other and with components of content displaying system 800 using over one or more signal lines (not shown) and/or wirelessly. Similarly, the various components of content displaying system 800 may communicate with each other over one or more signal lines (not shown) and/or wirelessly.

The terms "processor" as used herein may additionally or alternatively refer to a controller. Processor 802 may include and/or relate to various types of processors and/or processor architectures including, for example, embedded processors and/or communication processors.

According to some embodiments, memory 804 may include one or more types of computer-readable storage media including, for example, transactional memory and/or long-term storage memory facilities and may function as file storage, document storage, program storage, or as a working memory.

According to some embodiments, processor 802, memory 804, communication module 808 and/or power module 810 may be integrated in wearable apparatus 100, e.g., in center frame portion 112 and/or bow 116.

Communication module 808 may communicate with external content provider system 102 over communication network 104 which may relate to a variety of networks and/or standards. Accordingly, external content provider system 102 comprises a communication module (not shown), a processor (not shown) and a memory (not shown).

Communication module 808 may receive data stored in the memory (not shown) of external content provider system 102 over a wired and/or wireless communication network. Optionally, communication module 808 may provide data stored in memory 804 to external content provider system 102. Communication module 808 may for example include I/O device drivers (not shown) and network interface drivers (not shown). A device driver may for example, interface with a keypad or to a USB port. A network interface driver may for example protocols for short range wireless communication protocols like, for instance, Zigbee™, Bluetooth® and/or Wi-Fi protocols, the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, and/or any other current or future communication network, standard, and/or system.

According to some embodiments, communication module 808 may be operative to be substantially non-radiating, i.e., such to qualify as a wireless receiver-only communication module. In some embodiments, the wireless receiving of data may also be disabled. In exemplary embodiments, wired transmission and receiving of data between communication module 808 and external content provider system 102 may be possible.

Processor 802 may be operative to run or execute various sets of instructions stored in memory 804 to result in the running of procedures relating to the control of components of wearable electronic apparatus 100 including, for example, a content display engine 806. According to some embodiments, input device 126 may for example be operatively coupled with image capturing device 120. Content display engine 806 may for example cause, responsive to an input provided by the user via input device 126, the receiving of data from content provider system 102 and adjust the content suitable for being displayed to the user by viewing optics 108. In some embodiments, content may be provided to the user by viewing optics 108 in accordance with a "push-settings" or "push-message" or "push-notification" configuration. For example, the user may subscribe to receive push notifications such as, for example, push email notifications, e.g., at electronic wearable apparatus 100. Accordingly, content provider system 102 may be the equivalent to a "push server" and wearable electronic apparatus 100 a "mobile push client" of an information push message system. In some embodiments, by default the settings for receiving information at wearable apparatus 100 may be a push-configuration settings.

Data received at content provider system and representative of text received by the system may be formatted to fit viewing optics 108. Content displaying engine 806 may be operative to display and/or notify a user via display optics 108 about textual information only and, if applicable, discard and/or filter out non-textual information. The filtering and/or discarding may be executed at content provider system 102 and/or at content display system 800 by content display engine 806. It is noted that the extraction of textual information from non-textual information is considered to be equivalent to the discarding and/or filtering out non-textual information to obtain textual information only.

Content display engine 806, in conjunction with viewing optics 108, may be operative to select the number of lines to be displayed to the user. For instance, viewing optics 108 and content display engine 806 may be operative such that, at most, one, two, three or four lines of text of a script are displayed to the user at the same time. The selection of the number of lines may be made by the user.

According to some embodiments, wearable electronic apparatus 100 may include one or more proximity and/or touch sensors (not shown) operative to determine whether the electronic apparatus is worn by user 106. For example, sensors may be arranged on nosepiece 114 and on an ear portion of bow 116 which is located behind the user's ear or ears when the electronic apparatus is worn by him/her. Content display system 800 may be activated, when all sensors are "in place", i.e., engage with user's nose and tissue behind his/her ear and are responsively indicate that the electronic apparatus is worn by the user. Otherwise, content display system 800 may be or remain deactivated.

While the components and/or features of content displaying system 800 are schematically illustrated as being implemented at a single location, this should by no means to be construed limiting. Accordingly, elements of any one of the components of content displaying system 800 may be implemented at various locations, e.g., of wearable electronic apparatus 100 and/or content provider system 102. Some parts of memory 804 may for example be included in sound capturing device 121 and some in image capturing device 120 and/or comprised in any other element of the wearable electronic apparatus.

Additionally or alternatively, power module 810 may for instance comprise a power source embedded in content provider system 106 and be operatively coupled (e.g., through a USB connection or any other suitable wired or wireless connection) with wearable electronic apparatus 100 to various components thereof including, for example, power viewing optics 108, image capturing device 120, sound capturing device 121, sound output device 123, input device 126 and processor 802 for controlling the various components. Moreover, some features of content display engine 806 may be effected at content provider system 102 and some at wearable electronic 100. It should be noted that the expression "mounted on" may also encompass the meaning of the expression "mounted in" or "included in".

The terms "right", "left", "bottom", "below", "lowered", "lower", "low", "top", "above", "upper", "elevated" and "high" as well as grammatical variations thereof as used herein do not necessarily indicate that, for example, a "lower" component is below an "upper" component, or that a component that is "lower" is indeed "below" another component or that a component that is "upper" is indeed "above" the "lower" component as such directions, components or both may be flipped, rotated, moved in space, placed in a diagonal orientation or position, placed horizontally or vertically, or similarly modified. Accordingly, it will be appreciated that the terms "lower", "bottom", "below", "upper", "top" and "above" may be used herein for exemplary purposes only, to illustrate the relative positioning or placement of certain components, to indicate a first and a second component or to do both.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A wearable apparatus which can display content from a content provider to a user's view, comprising:
 a head-mountable frame wearable by a user;
 a display for projecting an image;
 a waveguide element having a top edge and a bottom edge, said waveguide element supported by said head-mountable frame with a defined first orientation having said top edge vertically separated from said bottom edge by a body of said waveguide element when the head-mountable frame is worn, said waveguide element having an image receiving side operative to receive said projected image from said display, said body oriented in the line of sight of a user in said first orientation;
 said waveguide element further including a first reflection surface at an edge vertically separated from said image receiving side by said waveguide element body in said first orientation;
 said display arranged relative to said waveguide element to project the image vertically through the body of said waveguide element, in said first orientation, between said image receiving side of said waveguide element and said first reflection surface, a vertical path between said display and said first reflection surface being unobstructed through said body;
 said waveguide element configured to extend from above an eye of the user to below an eye of the user, said display being arranged relative to said waveguide element at one of above the user's eye or below the user's eye, and said first reflection surface arranged at an edge of said waveguide element the other one of said above the user's eye or below the user's eye, wherein, when the head-mountable frame is worn by the user in said first orientation, the projected image is positioned relative to the user's view such that the user, having a primary eye-gaze direction for viewing the user's normal viewpoints, views the projected image at said edge by altering the user's eye-gaze direction from said primary eye-gaze direction to a secondary, non-primary eye-gaze direction for viewing the image; and
 communication means for communicative association with said content provider.

2. The wearable apparatus according to claim 1, where the body of said waveguide element has vision correction properties.

3. The wearable apparatus according to claim 1, where the waveguide element includes magnifying properties for magnifying said image.

4. The wearable apparatus according to claim 1, where the waveguide element includes a second reflective surface for reflecting the image reflected from the first reflective surface to the user's view.

5. The wearable apparatus according to claim 3, where the magnification properties of the waveguide element are provided by a convex surface shaped in a convex manner along the length of the waveguide element.

6. The wearable apparatus according to claim 3, where the magnification properties of the waveguide element are provided by a convex surface shaped in a convex manner along the width of the glass.

7. The wearable apparatus according to claim 1, where the waveguide includes a prism.

8. The wearable apparatus according to claim 7, where the prism includes a surface for magnifying the displayed content.

9. The wearable apparatus according to claim 1, wherein said waveguide element has a viewing area in said first orientation having a length to width display ratio of one of the following: 1:3, 1:4, 1:5, 1:6, 1:7, 1:8 or 1:16.

10. The wearable apparatus according to claim 1, comprising an image capturing device.

11. The wearable apparatus according to claim 1, comprising a sound capturing device.

12. The wearable apparatus according to claim 1, comprising a sound output device.

13. The wearable apparatus according to claim 1, comprising an input device.

14. The wearable apparatus according to claim 1, where the wearable apparatus has a binocular lens frame body.

15. The wearable apparatus according to claim 1, where the wearable apparatus has a monocular lens frame body.

16. The wearable apparatus according to claim 1, where the waveguide element has an angle to best reflect the content to the user's eye.

17. The wearable apparatus according to claim 1, where the waveguide element has a shape to best reflect the content to the user's eye.

18. A wearable apparatus configured to display visual content received from a content provider over a communication network to a user's view when worn in a first orientation, the wearable apparatus comprising:
   a frame configured to be worn in the first orientation;
   a waveguide element supported by said frame in the first orientation, said waveguide element including a top edge and a bottom edge separated vertically from one another by a body of said waveguide element in said first orientation, one of said top edge or said bottom edge including an image receiving side, said body oriented in the line of sight of a user in said first orientation;
   a display adjacent to said image receiving side and oriented to project visual content vertically through said waveguide element;
   a first reflection surface adjacent to the other one of said top edge or said bottom edge of said waveguide element, said first reflection surface arranged to reflect visual content projected vertically through the body of said waveguide element by said display, a vertical path between said display and said first reflection surface being unobstructed through said body;
   said waveguide element configured to extend from above an eye of the user to below an eye of the user, said display being arranged relative to said waveguide element at one of above the user's eye or below the user's eye, and said first reflection surface arranged at an edge of said waveguide element the other one of above the user's eye or below the user's eye, wherein, when said frame is worn by the user in said first orientation, the projected image is positioned relative to the user's view such that the user, having a primary eye-gaze direction for viewing the user's normal viewpoints, views the projected image at said edge by altering the user's eye-gaze direction from said primary eye-gaze direction to a secondary, non-primary eye-gaze direction for viewing the image;
   a second reflection surface disposed on a portion of said waveguide and oriented to reflect visual content reflected from said first reflection surface to the user's view, in said first orientation; and
   a communication module configured to receive content over the communication network and provide received content to the display.

19. A content display lens for a wearable apparatus to display visual content received from a content provider to a user's view when worn in a first orientation, the content display lens comprising:
   a display for projecting the visual content;
   a waveguide element having a top edge and a bottom edge in the first orientation, said top edge vertically separated from said bottom edge by a body of said waveguide element in the first orientation, said waveguide element having an image receiving side operative to receive said projected visual content from said display, said body oriented in the line of sight of a user in the first orientation;
   said waveguide element further including a first reflection surface at an edge vertically separated from said image receiving side by said waveguide element body in the first orientation;
   said display arranged relative to said waveguide element to project the visual content vertically through the body of said waveguide element, in the first orientation, between said image receiving side of said waveguide element and said first reflection surface, a vertical path between said display and said first reflection surface being unobstructed through said body;
   said waveguide element configured to extend from above an eye of the user to below an eye of the user, said display being arranged relative to said waveguide element at one of above the user's eye or below the user's eye, and said first reflection surface arranged at an edge of said waveguide element the other one of above the user's eye or below the user's eye, wherein, when the content display lens is worn by the user in the first orientation, the projected image is positioned relative to the user's view such that the user, having a primary eye-gaze direction for viewing the user's normal viewpoints, views the projected image at said edge by altering the user's eye-gaze direction from said primary eye-gaze direction to a secondary, non-primary eye-gaze direction for viewing the image; and
   a communication device for receiving content from a content provider.

* * * * *